United States Patent
Themelis (10) Patent No.: US 12,352,947 B2
(45) Date of Patent: Jul. 8, 2025

(54) MICROSCOPE AND RELATED APPARATUSES, METHODS, AND COMPUTER PROGRAMS

(71) Applicant: Leica Instruments (Singapore) Pte. Ltd., Singapore (SG)

(72) Inventor: George Themelis, Lindau (DE)

(73) Assignee: Leica Instruments (Singapore) Pte Ltd., Singapore (SG)

( * ) Notice: Subject to any disclaimer, the term of this patent is extended or adjusted under 35 U.S.C. 154(b) by 105 days.

(21) Appl. No.: 17/754,615

(22) PCT Filed: Oct. 7, 2020

(86) PCT No.: PCT/EP2020/078153
§ 371 (c)(1),
(2) Date: Apr. 7, 2022

(87) PCT Pub. No.: WO2021/069512
PCT Pub. Date: Apr. 15, 2021

(65) Prior Publication Data
US 2022/0365331 A1   Nov. 17, 2022

(30) Foreign Application Priority Data
Oct. 10, 2019   (EP) ..................... 19202503

(51) Int. Cl.
G02B 21/36 (2006.01)
G01N 21/64 (2006.01)
G02B 21/06 (2006.01)
G02B 21/16 (2006.01)
G02B 21/18 (2006.01)
(Continued)

(52) U.S. Cl.
CPC ....... G02B 21/367 (2013.01); G01N 21/6458 (2013.01); G01N 21/6486 (2013.01);
(Continued)

(58) Field of Classification Search
None
See application file for complete search history.

(56) References Cited

U.S. PATENT DOCUMENTS

2002/0103439 A1   8/2002   Zeng et al.
2006/0241496 A1   10/2006   Fengler et al.
(Continued)

FOREIGN PATENT DOCUMENTS

CN    103765289 A    4/2014
CN    105283754 A    1/2016
(Continued)

*Primary Examiner* — Hung Q Dang
(74) *Attorney, Agent, or Firm* — 2SPL Patent Attorneys PartG mbB; Yong Beom Hwang (57) ABSTRACT

Examples relate to a microscope, and to an apparatus, method and computer program for a microscope. The microscope comprises a light emission module for providing illumination for a sample of organic tissue in a plurality of wavelength bands. The microscope comprises one or more imaging sensor modules configured to independently sense light in a plurality of mutually separated wavelength bands of the plurality of wavelength bands. The microscope comprises a processing module configured to control the light emission module such, that in a first operating mode light in a first subset of the plurality of wavelength bands is emitted towards the sample of organic tissue, and that in a second operating mode light in a second subset of the plurality of wavelength bands is emitted towards the sample of organic tissue. The first and second subset of wavelength bands are at least partially different. The processing module is configured to use the one or more imaging sensor modules to perform reflectance imaging and fluorescence imaging in each of the plurality of mutually separated wavelength bands based on the light emitted in the first and second operating modes.

14 Claims, 5 Drawing Sheets

(51) Int. Cl.
 *G02B 27/14* (2006.01)
 *H04N 23/45* (2023.01)
 *H04N 23/56* (2023.01)
 *H04N 23/667* (2023.01)

(52) U.S. Cl.
 CPC ............ *G02B 21/06* (2013.01); *G02B 21/16* (2013.01); *G02B 21/18* (2013.01); *G02B 27/141* (2013.01); *H04N 23/45* (2023.01); *H04N 23/56* (2023.01); *H04N 23/667* (2023.01)

(56) References Cited

U.S. PATENT DOCUMENTS

| | | |
|---|---|---|
| 2009/0201577 A1 | 8/2009 | LaPlante et al. |
| 2012/0200687 A1* | 8/2012 | Kikuchi ................. A61B 1/041 348/370 |
| 2012/0200694 A1* | 8/2012 | Garsha ............... G01N 21/6456 382/128 |
| 2013/0041267 A1 | 2/2013 | Ntziachristos et al. |
| 2016/0270640 A1 | 9/2016 | Fengler et al. |
| 2017/0223316 A1 | 8/2017 | Zeng et al. |
| 2018/0196246 A1 | 7/2018 | Bares et al. |

FOREIGN PATENT DOCUMENTS

| | | | |
|---|---|---|---|
| CN | 107920726 A | 4/2018 | |
| JP | 2013507612 A | 3/2013 | |
| JP | 2013519867 A | 5/2013 | |
| JP | 2017529514 A | 10/2017 | |
| KR | 1020120066654 A | 6/2012 | |
| WO | WO-2016103643 A1 * | 6/2016 | ......... A61B 1/00163 |

* cited by examiner

MICROSCOPE AND RELATED APPARATUSES, METHODS, AND COMPUTER PROGRAMS

TECHNICAL FIELD

Examples relate to a microscope, and to an apparatus, method and computer program for a microscope.

BACKGROUND

Microscopes may be used for imaging in various imaging modes. For example, a microscope may comprise two sensors, of which one is used for fluorescence imaging and one is used for reflectance imaging. The two imaging sensor modules might be used for imaging in different wavelength bands. Such microscopes usually comprise a light source which is used to emit light that can be picked up by the respective sensors, e.g. as reflection (i.e. at the same wavelength as emitted) or as fluorescence (i.e. at a wavelength that is different from the wavelength of the emitted light).

SUMMARY

There may be a desire for an improved concept for a microscope, in which the sensors are used in a more versatile fashion.

This desire is addressed by embodiments of the present disclosure.

Embodiments of the present disclosure provide a microscope. The microscope comprises a light emission module for providing illumination for a sample of organic tissue in a plurality of wavelength bands. The microscope comprises one or more imaging sensor modules configured to independently sense light in a plurality of mutually separated wavelength bands of the plurality of wavelength bands. The microscope comprises a processing module configured to control the light emission module such, that in a first operating mode light in a first subset of the plurality of wavelength bands is emitted towards the sample of organic tissue, and that in a second operating mode light in a second subset of the plurality of wavelength bands is emitted towards the sample of organic tissue. The first and second subset of wavelength bands are at least partially different. The processing module is configured to use the one or more imaging sensor modules to perform reflectance imaging and fluorescence imaging in each of the plurality of mutually separated wavelength bands based on the light emitted in the first and second operating modes.

By utilizing one or more imaging sensor modules that are capable of sensing light in a plurality of mutually separated wavelength bands, and if the light emission module provides the light in a suitable manner, embodiments may use a single imaging sensor to perform reflectance imaging and fluorescence imaging in the same wavelength band, improving a versatility of the imaging. Furthermore, if multiple imaging sensor modules are used, the versatility may be further improved, as different combinations of wavelength bands may be used to cover all of the wavelength bands in both fluorescence and reflectance imaging, e.g. at the same time. This is enabled by a light emission module that is capable of emitting light at different wavelength bands in the different operating modes.

An embodiment of the present disclosure relates to an apparatus for a microscope. The apparatus may be used to control the microscope, e.g. with regards to illumination and imaging. The apparatus comprises an interface for communicating with a light emission module for providing illumination of a sample of organic tissue in a plurality of wavelength bands. The interface is further suitable for communicating with one or more imaging sensor modules configured to independently sense light in a plurality of mutually separated wavelength bands of the plurality of wavelength bands of the microscope. The apparatus comprises a processing module configured to control the light emission module such, that in a first operating mode light in a first subset of the plurality of wavelength bands is emitted towards the sample of organic tissue, and that in a second operating mode light in a second subset of the plurality of wavelength bands is emitted towards the sample of organic tissue. The first and second subset of wavelength bands are at least partially different. The processing module is configured to use the one or more imaging sensor modules to perform reflectance imaging and fluorescence imaging in each of the plurality of mutually separated wavelength bands based on the light emitted in the first and second operating modes.

An embodiment of the present disclosure relates to a corresponding method for a microscope. The method comprises controlling a light emission module such, that in a first operating mode light in a first subset of a plurality of wavelength bands is emitted towards a sample of organic tissue, and that in a second operating mode light in a second subset of the plurality of wavelength bands is emitted towards the sample of organic tissue. The first and second subset of wavelength bands are at least partially different. The light emission module is suitable for providing illumination of the sample of organic tissue in the plurality of wavelength bands. The method comprises using one or more imaging sensor modules to perform reflectance imaging and fluorescence imaging in each of a plurality of mutually separated wavelength bands based on the light emitted in the first and second operating modes. The one or more imaging sensor modules is configured to independently sense light in the plurality of mutually separated wavelength bands (e.g. being a subset of the plurality of wavelength bands of the microscope). An embodiment of the present disclosure relates to a computer program with a program code for performing the method when the computer program is executed on a processor.

SHORT DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
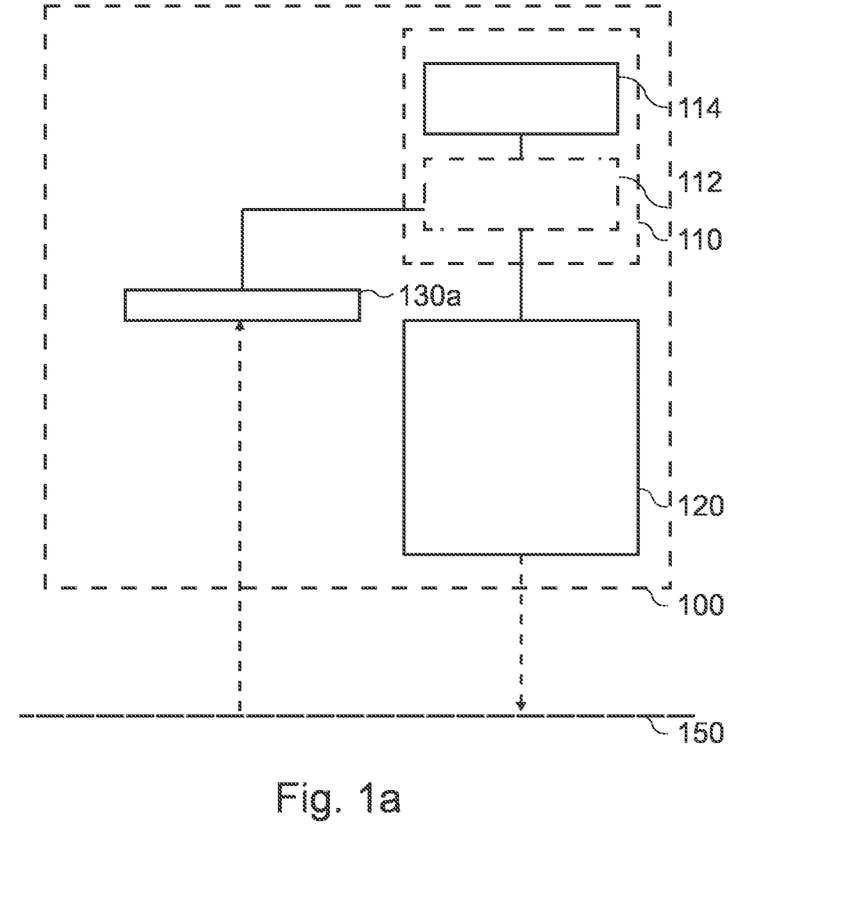
FIGS. 1a and 1b show block diagrams of embodiments of a microscope and of an apparatus for a microscope.
Figure 1B:
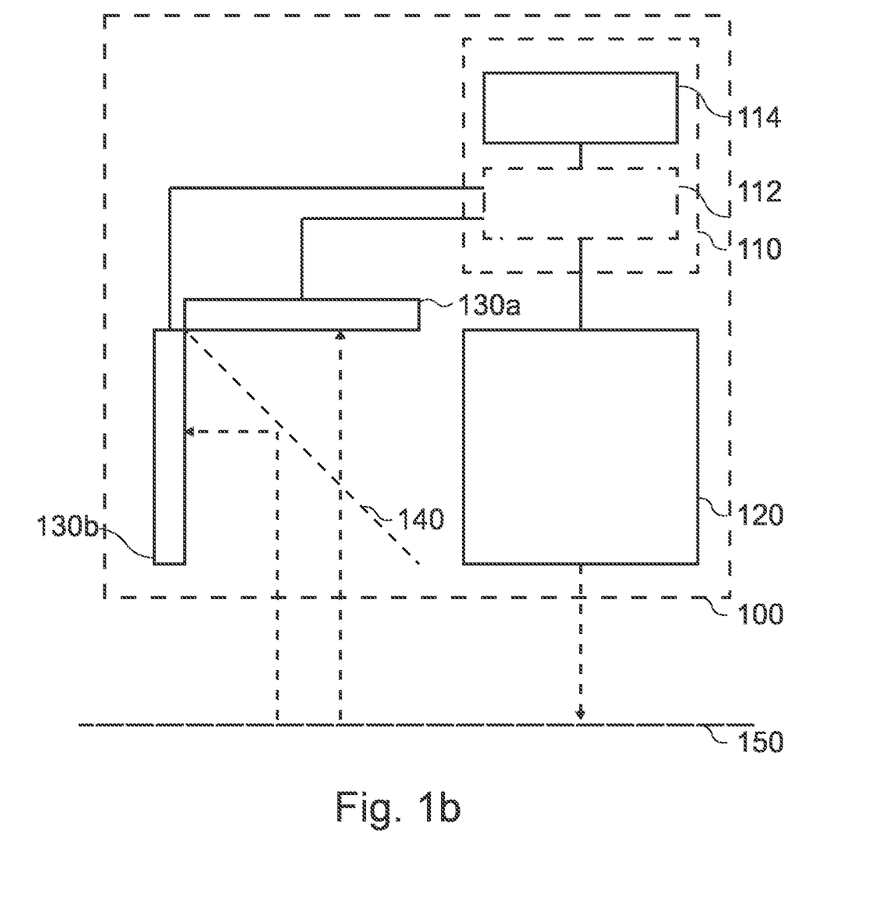

FIG. 1a and 1b show block diagrams of embodiments of a microscope 100. The microscope 100 comprises a light emission module 120 for providing illumination for a sample of organic tissue 150 in a plurality of wavelength bands. The microscope 100 further comprises one or more imaging sensor modules 130a; 130b configured to independently sense light in a plurality of mutually separated wavelength bands of the plurality of wavelength bands. The microscope 100 further comprises a processing module 114 that is coupled to the light emission module 120 and to the one or more imaging sensor modules 130a; 130b, e.g. via an interface 112. FIGS. 1a and 1b further show embodiments of an apparatus 110 comprising the processing module 114 and the interface 112, which is coupled to the processing module 114. The interface 112 is suitable for communicating with the light emission module 120 and with the one or more imaging sensor modules 130a; 130b. The processing module is configured to control the light emission module 120 such, that in a first operating mode light in a first subset of the plurality of wavelength bands is emitted towards the sample of organic tissue 150, and that in a second operating mode light in a second subset of the plurality of wavelength bands is emitted towards the sample of organic tissue 150. The first and second subset of wavelength bands are at least partially different. The processing module 114 is configured to use the one or more imaging sensor modules 130a; 130b to perform reflectance imaging and fluorescence imaging in each of the plurality of mutually separated wavelength bands based on the light emitted in the first and second operating modes. FIG. 1b shows a possible implementation of the microscope and/or apparatus of FIG. 1a, in which an optical element 140, such as a polychroic mirror, and two imaging sensor modules 130a; 140a are used.

Embodiments relate to a microscope, or to an apparatus, method or computer program for a microscope. In general, a microscope is an optical instrument that is suitable for examining objects that are too small to be examined by the human eye (alone). For example, a microscope may provide an optical magnification of an object, such as the sample of organic tissue.

In modern microscopes, the optical magnification is often provided for a camera or an imaging sensor, such as the one or more imaging sensor modules 130a/b of the microscope 100 of FIGS. 1a and/or 1b. In other words, the microscope 100 may further comprise one or more optical magnification components that are used to magnify a view on the sample of organic tissue. For example, the microscope 100 may be a microscope for use in a laboratory, e.g. a microscope that may be used to examine the sample of organic tissue in a petri dish. Alternatively, the microscope 100 may be part of a surgical microscope system, e.g. a microscope to be used during a surgical procedure. Although embodiments are described in connection with a microscope, they may also be applied, in a more general manner, to any optical device comprising a light emission module and one or more imaging sensor modules. Accordingly, the apparatus 110 is also suitable, in more general terms, for such an optical device.

The microscope comprises the light emission module 120. The light emission module 120 is suitable for, and/or configured to, providing/provide illumination for the sample of organic tissue in the plurality of wavelength bands. For example, the plurality of wavelength bands may be a plurality of wavelength bands that are mutually separated, i.e. that are non-overlapping and/or that are defined as individual wavelength bands, i.e. not as a continuous wavelength band comprising two or more of the plurality of wavelength bands. For example, the light emission module 120 may be configured to block out light emissions at wavelengths outside the plurality of wavelength bands, e.g. light emissions at wavelengths that lie between the plurality of wavelength bands. In other words, the light emission module 120 may be a multi-spectral light emission module 120 configured to emit the plurality of wavelength bands in a mutually separated manner.

Similar considerations apply to the plurality of mutually separated wavelength bands. For example, the plurality of mutually separated wavelength bands may be non-overlapping wavelength bands and/or may be defined as individual wavelength bands, i.e. not as a continuous wavelength band comprising two or more of the plurality of mutually separated wavelength bands. For examples, the one or more imaging sensor modules may be configured to disregard light at wavelengths outside the plurality of mutually separated wavelength bands. In at least some embodiments, the one or more imaging sensor modules may comprise two or more optical (bandpass) filters for filtering out light outside the plurality of mutually separated wavelength bands. The respective filters may be part of the respective filter modules, or may be arranged between all of the imaging sensor modules and the sample of organic tissue. For example, the two or more bandpass filters may be implemented by a polychroic mirror 140 to be arranged between the sample of organic tissue 150 and the one or more imaging sensor modules 130a; 130b.

For example, the light emission module may comprise (exactly) one, or a plurality of, individual light sources for generating the light to be emitted. For example, the light emission module may comprise one, e.g. exactly one, broadband light source and a plurality of bandpass filters that are, in combination, suitable for providing illumination for the sample of organic tissue in the plurality of wavelength bands. For example, the light emission module 120 may be configured to use two or more optical filters (i.e. a plurality of optical filters, the number of filters matching the number of wavelength bands of the plurality of wavelength bands) to emit the plurality of wavelength bands in a mutually separated manner. For example, the two or more optical filters may be optical bandpass filters, with the pass-bands of the optical bandpass filters matching the plurality of wavelength bands. For example, the two or more filters may be part of in the light emission module 120.

Alternatively, the light emission module 120 may be configured to use a plurality of individual light sources to emit the plurality of wavelength bands in a mutually separated manner. For example, the plurality of individual light sources may be a plurality of LEDs (Light Emitting Diodes), each LED being configured to emit light (only) in a wavelength band of the plurality of wavelength bands. Each of the plurality of individual light sources may be tuned to a wavelength bands of the plurality of wavelength bands. In some embodiments, in addition to the plurality of individual light sources, the two or more optical filters may be used to emit the plurality of wavelength bands in a mutually separated manner, e.g. to more precisely define the plurality of wavelength bands.

In embodiments, a plurality of different operating modes are used, which may influence the light emitted by the light emission module. For example, the plurality of different operating modes includes at least the first and the second operating modes referred to above. The processing module 114 is configured to control the light emission module 120 such, that in the first operating mode light in a first subset of the plurality of wavelength bands is emitted towards the sample of organic tissue 150, and that in a second operating mode light in a second subset of the plurality of wavelength bands is emitted towards the sample of organic tissue 150. For example, each operating mode may cause the light emission module to emit a different subset (or combination/permutation) of wavelength bands to be emitted. In this context, a subset of wavelength bands may comprise one or more wavelength bands. In other words, each subset of wavelength bands may comprise (or be composed of) light of one or more of the plurality of wavelength bands (and no light at wavelengths outside the one or more wavelength bands). The different subsets of wavelength bands may be at least partially different, e.g. either partially different or entirely different. Two subsets of wavelength bands are partially different, if they share at least one wavelength band that is included in both subsets. Two subsets of wavelength bands are entirely different, if they share no wavelength bands, i.e. the wavelength bands of the two subsets do not overlap. In embodiments, the first and second subset of wavelength bands may be partially different, or they may be entirely different.

For example, in the following, a combination of a first and a second operating mode is shown, in which the first and second subsets are entirely different. The processing module 114 may be configured to control the light emission module 120 such, that, in one of the operating modes, e.g. in the first operating mode, (only) light in a wavelength band outside of the plurality of mutually separated wavelength bands is emitted by the light emission module 120. For example, this wavelength band may be denoted as wavelength band "0" in FIGS. 3 and 4. As this wavelength band is not one of the plurality of mutually separated wavelength bands, it might be used only for fluorescence imaging, i.e. to perform fluorescence imaging at each of the plurality of mutually separated wavelength bands. In addition (or alternatively), the processing module 114 may be configured to control the light emission module 120 such, that, in one of the operating modes, e.g. in the second operating mode, light at each of the plurality of mutually separated wavelength bands is emitted by the light emission module 120. For example, in this operating mode, reflectance imaging may be performed at each of the plurality of mutually separated wavelength bands. These two operating modes represent the edge cases, in which reflectance imaging or fluorescence imaging may be performed simultaneously at each of the plurality of mutually separated wavelength bands (see e.g. FIG. 4 reference signs 460 and 480).

In some operating modes, a mixed mode may be applied, in which one or more of the plurality of mutually separated wavelength bands is used for reflectance imaging and one or more other wavelength bands are used for fluorescence imaging. For example, the plurality of mutually separated wavelength bands may comprise a third subset of wavelength bands and a fourth subset of wavelength bands. The third and fourth subset may be disjoint, and may comprise the entire plurality of mutually separated wavelength bands. In other words, each wavelength band of the plurality of different wavelength bands might either be part of the third or of the fourth subset. In some embodiments, either the third or the fourth subset may be used in conjunction with the wavelength band outside of the plurality of mutually separated wavelength bands. The processing module 114 may be configured to control the light emission module 120 such, that, in one of the operating modes, e.g. in the first operating mode or in a third operating mode, (only) light in the third subset of wavelength bands is emitted by the light emission module 120, and that in one of the operating modes, e.g. the second or in a fourth operating mode, (only) light in the fourth subset of wavelength bands is emitted by the light emission module 120. In some embodiments, each of the third and fourth subset of wavelength bands may comprise two or more wavelength bands, which enables a simultaneous recording of different wavelength bands.

In some embodiments, the first subset may be equal to, or comprise, the third subset and/or the second subset may be equal to, or comprise, the fourth subset of wavelength bands. In other words, the first subset of the plurality of wavelength bands may comprise (or correspond to) the third subset of wavelength bands of the plurality of mutually separated wavelength bands. The second subset of the plurality of wavelength band may comprise the fourth subset of wavelength bands of the plurality of mutually separated wavelength bands. This may provide an association between the first/third and second/fourth subsets of wavelength bands, which may be used to perform the imaging using the one or more imaging sensor modules.

Figure 4:
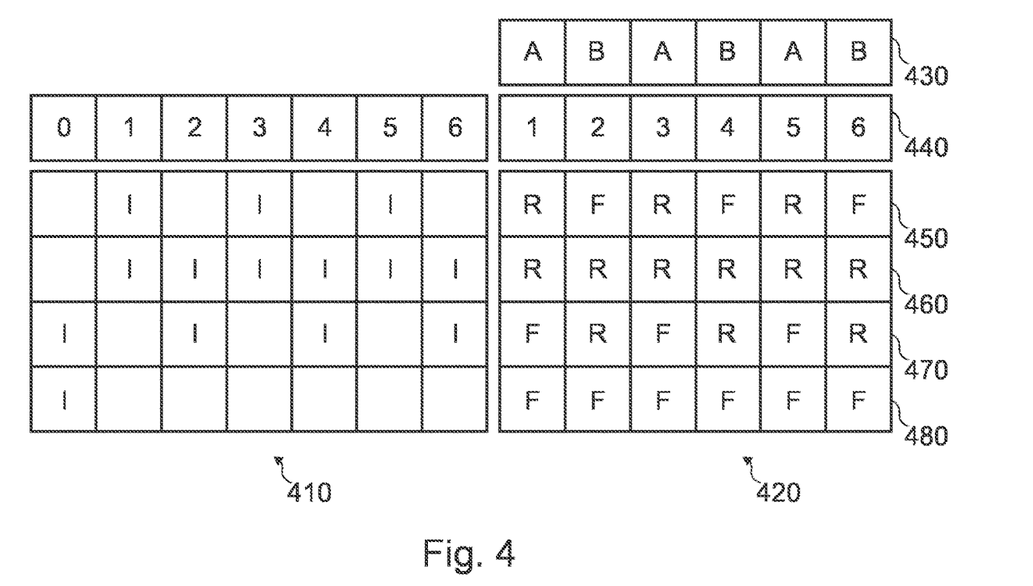
FIG. 4 shows a table of different illumination spectra and imaging modes according to an embodiment.

To sum it up, four different operating modes may be differentiated, in which the light emission module is controlled to emit:

(1) Light in all of the plurality of mutually separated wavelength bands (2) Light only in a wavelength band that is outside the plurality of mutually separated wavelength bands (3) Light in the third subset of wavelength bands, and optionally the wavelength band that is outside the plurality of mutually separated wavelength bands (4) Light in the fourth subset of wavelength bands, and optionally the wavelength band that is outside the plurality of mutually separated wavelength bands For example, the control module may be configured to apply two or more of the above operating modes, i.e. the first and second operating modes may be chosen from among the above operating modes (1)-(4). Additionally, a third or a third and a fourth operating mode may be used. For example, when using three operating modes, (3) may be used as the first operating mode, (4) as the second operating mode, and (2) as the third. When using four operating modes, as shown in FIG. 4, all operating modes (1) to (4) may be used.

In general, each operating mode may be used to perform a single recording with the one or more imaging sensor modules. For example, within one operating mode, all of the plurality of mutually separated wavelength bands may be recorded (substantially) simultaneously using the one or more imaging sensor modules, i.e. within at most a second (or at most 0.5 s, at most 0.3 s, at most 0.1 s). The different operating modes may be used in a subsequent manner, i.e. one after the other. For example, the first, second, and optionally third and fourth operating modes may be used in this order. Alternatively, another order may be chosen.

The microscope comprises the one or more imaging sensor modules 130a; 130b. The one or more imaging sensor modules are configured to independently sense light in the plurality of mutually separated wavelength bands of the plurality of wavelength bands. In other words, the one or more imaging sensor modules may be configured to sense the light in the plurality of mutually separated wavelength bands such, that each wavelength band of the plurality of mutually separated wavelength bands is distinguishable (or output separately) in an output of one or more imaging sensor modules. For example, the one or more imaging sensor modules may be capable of outputting a separate sensor measurement for each of the plurality of mutually separated wavelength bands.

In some embodiments, as shown in FIG. 1b, the one or more imaging sensor modules may comprise a first 130a and a second 130b imaging sensor module. Alternatively, as shown in FIG. 1, the microscope 100 may comprise a single imaging sensor module 130a. The processing module 114 may be configured to use the first and second imaging sensor modules to perform reflectance imaging and fluorescence imaging in each of the plurality of mutually separated wavelength bands based on the light emitted in the first and second operating modes. By using two sensor modules, each of the sensor modules might only be required to sense a subset of the plurality of mutually separated wavelength bands, enabling a higher flexibility and/or facilitating a construction of the respective imaging sensor modules. For example, the first and second imaging sensor modules may be configured to sense different wavelength bands of the plurality of mutually separated wavelength bands. Thus, no circuitry may be included that is used to redundantly measure light in the same wavelength bands, enabling the higher flexibility and/or facilitating the construction of the respective imaging sensor modules. For example, each the first and second imaging sensor modules may be configured to only sense light in one or more wavelength bands not sensed by the respective other imaging sensor module.

For example, the first imaging sensor module may be configured to (only) sense light in the third subset of wavelength bands of the plurality of mutually separated wavelength bands. The second imaging sensor module may be configured to (only) sense light in the fourth subset of wavelength bands of the plurality of mutually separated wavelength bands. Together, the first and the second imaging sensor modules may cover the entire plurality of mutually separated wavelength bands, e.g. without having an overlap in the wavelength bands being measured. For example, the first imaging sensor module may be configured to output a separate sensor measurement for each of the wavelength bands of the third subset of wavelength bands. The second imaging sensor module may be configured to output a separate sensor measurement for each of the wavelength bands of the fourth subset of wavelength bands. In general, the one or more imaging sensor modules may be APS (Active Pixel Sensor)- or CCD (Charge-Coupled-Device)-based imaging sensor modules. For example, in APS-based imaging sensor modules, light is recorded at each pixel using a photodetector and an active amplifier of the pixel. APS-based imaging sensor modules are often based on CMOS (Complementary Metal-Oxide-Semiconductor) or S-CMOS (Scientific CMOS) technology. In CCD-based imaging sensor modules, incoming photons are converted into electron charges at a semiconductor-oxide interface, which are subsequently moved between capacitive bins in the imaging sensor modules by a control circuitry of the sensor imaging module to perform the imaging.

The processing module is configured to use the one or more imaging sensor modules 130a; 130b to perform reflectance imaging and fluorescence imaging in each of the plurality of mutually separated wavelength bands based on the light emitted in the first and second operating modes. In some embodiments, the light emitted in the first operating mode is used to perform reflectance imaging and the light emitted in the second operating mode is to perform fluorescence imaging in (all of) the plurality of mutually separated wavelength bands, e.g. when choosing operating modes (1) and (2) introduced above. For example, the processing module 114 may be configured to, using the first imaging sensor module 130a and the second imaging sensor module 130b, perform reflectance imaging in the first operating mode and to perform fluorescence imaging in the second operating mode (or vice versa). This may yield reflectance images and fluorescence images that are taken simultaneously, respectively, with a slight delay between the reflectance and fluorescence images. Alternatively, as introduced above, a mixed mode may be used, where both in the first and in the second operating mode, performance and reflectance imaging is performed. In this case, there may be a slight delay within the reflectance/fluorescence images, but not a general delay of one or the other. For example, the processing module 114 may be configured to, using the first imaging sensor module 130a, perform reflectance imaging in the first operating mode and to perform fluorescence imaging in the second operating mode. The processing module 114 may be configured to, using the second imaging sensor module 130b, perform fluorescence imaging in the first operating mode and to perform reflectance imaging in the second operating mode (or vice versa).

As introduced above, both approaches may be chosen, e.g. to increase the number of reflectance/fluorescence images taken at each wavelength. For example, the processing module 114 may be configured to, using the first imaging sensor module 130a and the second imaging sensor module 130b, perform reflectance imaging in the first operating mode and to perform fluorescence imaging in the second operating mode, using the first imaging sensor module 130a, perform reflectance imaging in a third operating mode and to perform fluorescence imaging in a fourth operating mode, and using the second imaging sensor module 130b, perform fluorescence imaging in the third operating mode and to perform reflectance imaging in the fourth operating mode. In any case, the numbering of the operating modes are only used to differentiate different operating modes, and may be changed, e.g. if another order of operating modes is desired.

When using two (or more) different imaging sensor modules, the light that originates from the sample of organic tissue may be distributed among the sensor modules using a polychroic mirror. In general, a polychroic mirror is an optical element that is configured to selectively reflect or admit light in a plurality of wavelength bands (hence the term "polychroic" for "having multiple colors"). In this case, the microscope may comprise a polychroic 140 that is configured to separate the light to be used by the first imaging sensor module from the light to be used by the second imaging sensor module. For example, the polychroic mirror 140 may be configured to separate the light having a wavelength in one of the third subset of wavelength bands from the light having a wavelength in one of the fourth subset of wavelength bands of the plurality of mutually separated wavelength bands. The polychroic mirror may be configured and arranged such that the light having a wavelength in one of the third subset of wavelength bands is admitted (or reflected) by the polychroic mirror and (re-) directed towards the first imaging sensor module. The polychroic mirror may be configured and arranged such that the light having a wavelength in one of the fourth subset of wavelength bands is reflected (or admitted) by the polychroic mirror and (re-) directed towards the second imaging sensor module. Alternatively, instead of a polychroic mirror, a semi-transparent mirror may be used, that is suitable for partially reflecting the light originating from the sample of organic tissue, regardless of the wavelength of the light, so that the full spectrum is directed at both imaging sensor modules.

The interface 112 may correspond to one or more inputs and/or outputs for receiving and/or transmitting information, which may be in digital (bit) values according to a specified code, within a module, between modules or between modules of different entities. For example, the interface 12 may comprise interface circuitry configured to receive and/or transmit information. In embodiments the processing module 114 may be implemented using one or more processing units, one or more processing devices, any means for processing, such as a processor, a computer or a programmable hardware component being operable with accordingly adapted software. In other words, the described function of the processing module 114 may as well be implemented in software, which is then executed on one or more programmable hardware components. Such hardware components may comprise a general purpose processor, a Digital Signal Processor (DSP), a micro-controller, etc.

More details and aspects of the microscope or the apparatus for the microscope are mentioned in connection with the proposed concept or one or more examples described above or below (e.g. FIGS. 2 to 4). The microscope or the apparatus for the microscope may comprise one or more additional optional features corresponding to one or more aspects of the proposed concept or one or more examples described above or below.

Figure 2:
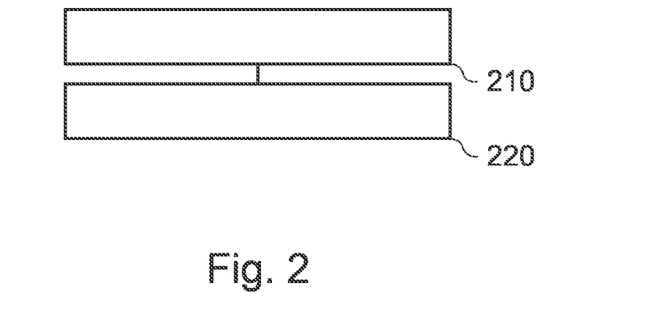
FIG. 2 shows a flow chart of an embodiment of a method for a microscope.

FIG. 2 shows a flow chart of an embodiment of a corresponding method, e.g. a computer-implemented method, for a microscope, e.g. the microscope 100 of FIGS. 1a and/or 1b. Although the aspects of the microscope have been described in the context of an apparatus, it is clear that these aspects also represent a description of the corresponding method, where a property or functional feature of the apparatus corresponds to a method step or a feature of a method step. The method comprises controlling 210 a light emission module 120 such, that in a first operating mode light in a first subset of a plurality of wavelength bands is emitted towards a sample of organic tissue 150, and that in a second operating mode light in a second subset of the plurality of wavelength bands is emitted towards the sample of organic tissue 150. The first and second subset of wavelength bands are at least partially different. The light emission module 120 is suitable for providing illumination of the sample of organic tissue 150 in the plurality of wavelength bands. The method comprises using 220 one or more imaging sensor modules to perform reflectance imaging and fluorescence imaging in each of a plurality of mutually separated wavelength bands based on the light emitted in the first and second operating modes. The one or more imaging sensor modules 130a; 130b are configured to independently sense light in the plurality of mutually separated wavelength bands being a subset of the plurality of wavelength bands of the microscope 100. As indicated above, features described in connection with the microscope 100 of FIG. 1a/b may be likewise applied to the method of FIG. 2.

More details and aspects of the method are mentioned in connection with the proposed concept or one or more examples described above or below (e.g. FIG. 1a/b, 3 or 4). The method may comprise one or more additional optional features corresponding to one or more aspects of the proposed concept or one or more examples described above or below.

At least some embodiments relate to a use of multiple imaging sensor modules to capture multiple images with different parameters, e.g. in a multi-sensor camera. The objective of at least some embodiments may be to improve a utilization of a presence of multiple imaging sensor modules within an imaging device like a surgical microscope Some imaging devices can employ multiple imaging sensor modules, such as CCD, CMOS, and SCMOS. This is due to the fact that it is useful to capture multiple images at the same time, each one of different nature, i.e. reflectance or fluorescence. For example multiple images that are captured simultaneously may be used to achieve color and visible pseudocolor, by capturing simultaneously reflectance and fluorescence images. In that case, for example, each sensor may be dedicated into capturing one type of image without the ability to change the functionality of the sensors. However, the functions some sensors serve might not always be required. For example, when fluorescence imaging is not required, the dedicated sensor remains unutilized. In embodiments, a way of repurpose installed imaging sensor modules to perform different functionalities is proposed.

Figure 3:
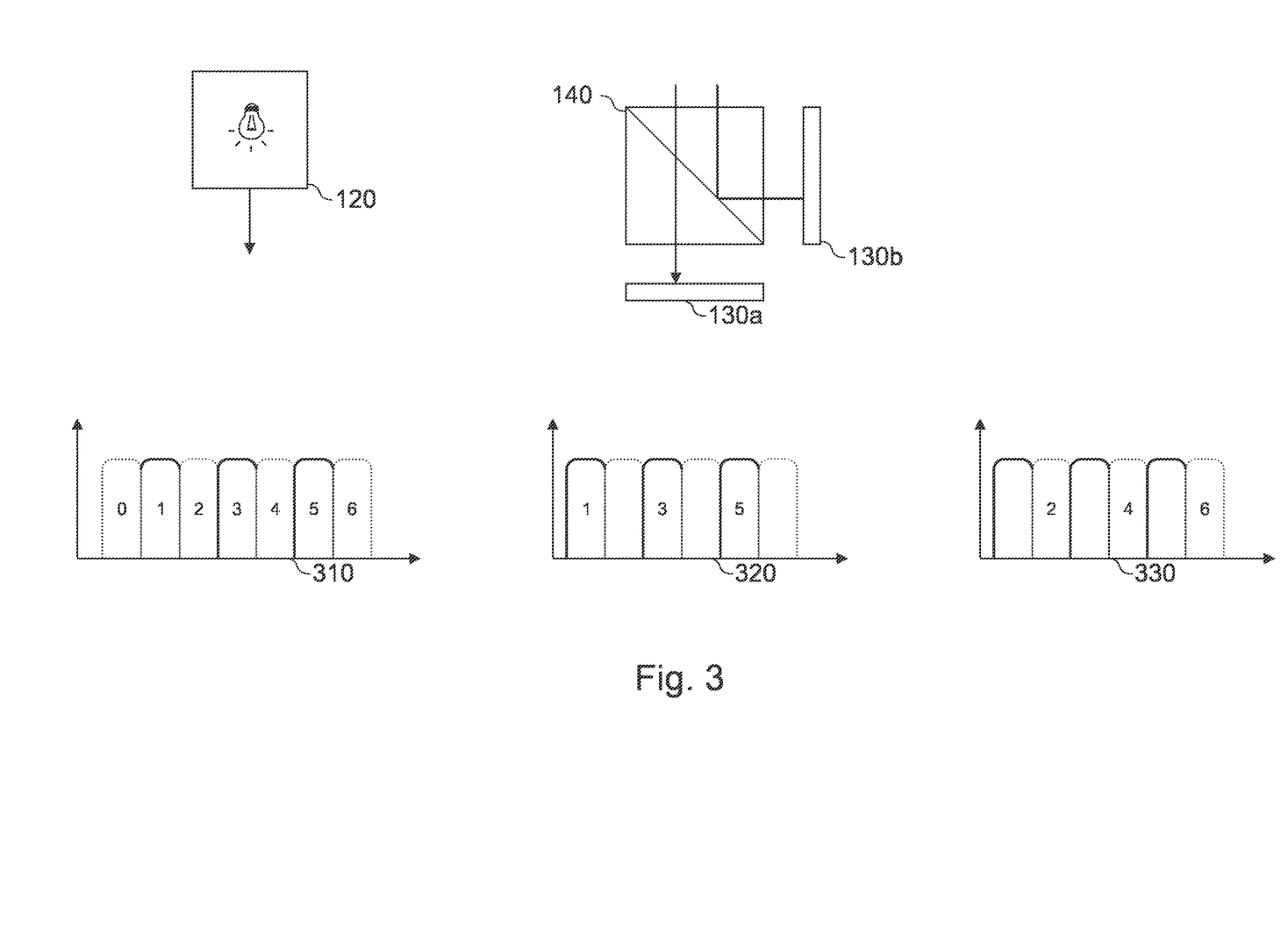
FIG. 3 shows a schematic overview of an optical imaging system, such as a microscope.

FIG. 3 shows a schematic overview of an optical imaging system, such as a microscope, comprising a light emission module 120 that is configured to provide illumination for an object in a subset of wavelength bands 0 to 6 as shown in diagram 310 (with the x-axis denoting the wavelength and the y-axis denoting the amplitude), and two imaging sensor modules 130a; 130b to record the light coming from the tissue, which is split at polychroic mirror 140. Diagram 320 shows the sensitivity of sensor 130a, and diagram 330 shows the sensitivity of sensor 130b (with the x-axis denoting the wavelength and the y-axis denoting the sensitivity towards light incident at the respective wavelengths). As shown in FIG. 3, sensor 130a is sensitive in wavelength bends 1, 3 and 5, while sensor 130b is sensitive in wavelength bands 2, 4 and 6. If the optical imaging system is used in medical applications, each wavelength band may be indicative or a specific type or condition of tissue (e.g. different tissue types, healthy tissue, pathologic tissue). FIG. 3 may thus show the spectral bands of the multispectral imaging sensor. In FIG. 3, the light emission module 120 is configured to emit light in wavelength bands 1, 3 and 5 (matching the wavelength bands of sensor 130a). In FIG. 3, sensor 130a receives the same bands as the illuminated light, and may therefore detect reflected light. Sensor 130b has a sensitivity curve complementary to the illumination spectrum, and therefore, detects only fluorescence.

By altering the illumination spectrum to illuminate at different spectral bands, the sensors 130a; and 130b may still sense the same spectral bands, but the light in their bands will be of different nature (reflectance/fluorescence). Adjusting the illumination spectral bands can be done, for example, by employing an interference multiple band-pass filer (at the light emission module 120), or by using a multispectral light source consisting of multiple (in this case: 7) monochromatic light sources, such as LEDs (Light Emitting Diodes).

In embodiments, the usage of the imaging sensor modules may be improved, by changing the light that is emitted towards the tissue. FIG. 4 shows a table of different illumination spectra that can be implemented using the light emission module 120, and that may lead to different imaging modes at the imaging sensor modules 130a; 130b (i.e. the consequent nature of measured spectral bands). In FIG. 4, the left side 410 of the table denotes the wavelength bands 0 to 6 440 emitted by the light emission module. For example, in the terms used in connection with FIGS. 1a/b, the light emitted at wavelength band 0 may be the light in a wavelength band that is outside the plurality of mutually separated wavelength bands. The wavelength bands 1 to 6 may correspond to the plurality of mutually separated wavelength bands. The right side 420 shows the imaging modes (R=reflectance, F=fluorescence) used at the respective sensor 430 (A=130a; B=130b) when the tissue is illuminated using the spectra shown on the left side 410. As shown in connection with FIGS. 1a/b, imaging sensor modules 130a; 130b cover (only) the plurality of mutually separated wavelength bands 1 to 6. Reference signs 450 to 480 show the different spectra that can be obtained in different operating modes of the light emission module. For example, the spectrum of reference sign 450 may correspond to the light emitted in operating mode (3) of FIGS. 1a/b, the spectrum of reference sign 460 may correspond to the light emitted in operating mode (1) of FIGS. 1a/b, the spectrum of reference sign 470 may correspond to the light emitted in operating mode (4)+the wavelength band 0 that is outside the plurality of mutually separated wavelength bands, and the spectrum of reference sign 480 may correspond to the light emitted in operating mode (2). The table below summarizes, at reference sign 410, four different illumination spectra (of which at least 460; 470 and 480 are previously unused), at reference sign 420, and whether reflectance or fluorescence is used. In the example of FIG. 4, the spectrum of reference sign 450 yields three spectral bands measured in reflectance and three spectral bands measured in fluorescence, the spectrum of reference sign 460 yields six spectral bands measured in reflectance, the spectrum of reference sign 470 yields three spectral bands measured in reflectance and three spectral bands measured in fluorescence, and the spectrum of reference sign 480 yields six spectral bands measured in fluorescence.

More details and aspects of the concepts shown in connection with FIGS. 3 and/or 4 are mentioned in connection with the proposed concept or one or more examples described above or below (e.g. FIGS. 1a/b and/or 2). The concepts shown in connection with FIGS. 3 and/or 4 may comprise one or more additional optional features corresponding to one or more aspects of the proposed concept or one or more examples described above or below.

Figure 5:
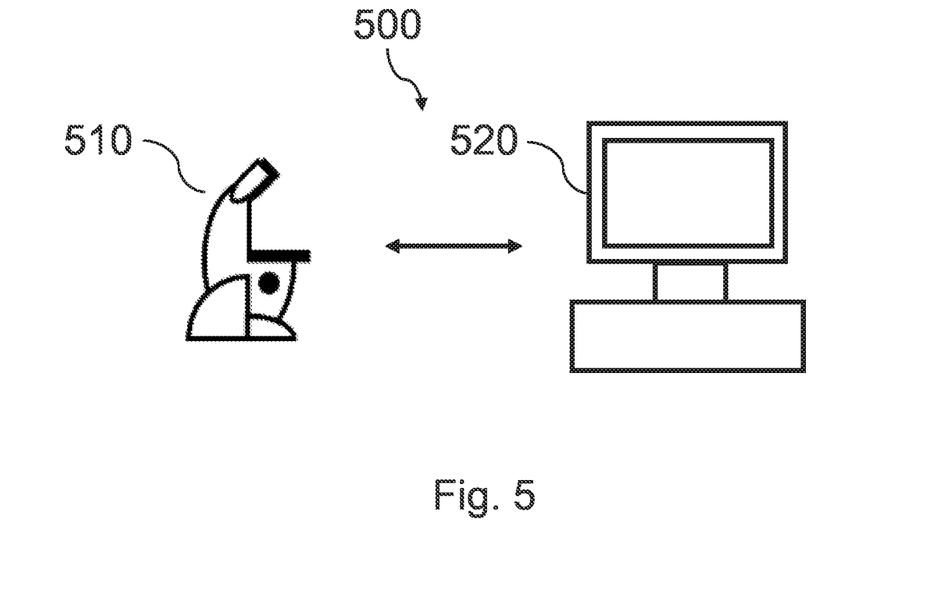
FIG. 5 shows a schematic diagram of a system comprising a microscope and a computer system.

Some embodiments relate to a microscope comprising a system as described in connection with one or more of the FIGS. 1 to 4. Alternatively, a microscope may be part of or connected to a system as described in connection with one or more of the FIGS. 1 to 4. FIG. 5 shows a schematic illustration of a system 500 configured to perform a method described herein. The system 500 comprises a microscope 510 and a computer system 520. The microscope 510 is configured to take images and is connected to the computer system 520. The computer system 520 is configured to execute at least a part of a method described herein. The computer system 520 may be configured to execute a machine learning algorithm. The computer system 520 and microscope 510 may be separate entities but can also be integrated together in one common housing. The computer system 520 may be part of a central processing system of the microscope 510 and/or the computer system 520 may be part of a subcomponent of the microscope 510, such as a sensor, an actor, a camera or an illumination unit, etc. of the microscope 510.

The computer system 520 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 520 may comprise any circuit or combination of circuits. In one embodiment, the computer system 520 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 520 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 520 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 520 may also include a display device, one or more speakers, and a keyboard and/or controller, which can include a mouse, trackball, touch screen, voice-recognition device, or any other device that permits a system user to input information into and receive information from the computer system 520.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

LIST OF REFERENCE SIGNS

100 Microscope
110 Apparatus for a microscope
112 Interface
114 Processing module
120 Light emission module
130a Imaging sensor module
130b Imaging sensor module
140 Polychroic mirror
150 Sample of organic tissue
210 Controlling a light emission module
220 Using one or more imaging sensor modules
310 Illumination diagram
320 Diagram of sensor sensitivity of sensor A
330 Diagram of sensor sensitivity of sensor B
410 Wavelength bands of light emitted by light emission module
420 Imaging mode of sensors A/B in wavelength bands
430 Sensor A or B
440 Wavelength bands
450 Light spectrum and corresponding imaging modes
460 Light spectrum and corresponding imaging modes
470 Light spectrum and corresponding imaging modes
480 Light spectrum and corresponding imaging modes
500 System
510 Microscope
520 Computer system

What is claimed is:

1. A microscope comprising:
a light emission module for providing illumination for a sample of organic tissue in a plurality of wavelength bands;
a first imaging sensor module and a second imaging sensor module configured to independently sense light in a plurality of mutually separated non-continuous wavelength bands, wherein the first imaging sensor module is configured to independently sense light in each wavelength band of a third subset of wavelength bands of the plurality of mutually separated non-continuous wavelength bands, and wherein the second imaging sensor module is configured to independently sense light in each wavelength band of a fourth subset of wavelength bands of the plurality of mutually separated non-continuous wavelength bands, wherein each of the third and fourth subset of wavelength bands comprises two or more mutually separated non-continuous wavelength bands; and a processing module configured to:
control the light emission module such that in a first operating mode light in a first subset of two or more mutually separated non-continuous wavelength bands is emitted towards the sample of organic tissue, and that in a second operating mode light in a second subset of two or more mutually separated non-continuous wavelength bands is emitted towards the sample of organic tissue, the first and second subset of two or more mutually separated non-continuous wavelength bands being at least partially different, and use the first and second imaging sensor modules to perform reflectance imaging and fluorescence imaging in each of the third and fourth subset of the plurality of mutually separated non-continuous wavelength bands based on the light emitted in the first and second operating modes.

2. The microscope according to claim 1, wherein the processing module is configured to, using the first imaging sensor module, perform reflectance imaging in the first operating mode and to perform fluorescence imaging in the second operating mode.

3. The microscope according to claim 1, wherein the processing module is configured to, using the second imaging sensor module, perform fluorescence imaging in the first operating mode and to perform reflectance imaging in the second operating mode.

4. The microscope according to claim 1, comprising a polychroic mirror configured to separate the light having a wavelength in one of the third subset of wavelength bands from the light having a wavelength in one of the fourth subset of wavelength bands of the plurality of mutually separated non-continuous wavelength bands.

5. The microscope according to claim 1, wherein the first subset of the plurality of mutually separated non-continuous wavelength bands comprises the third subset of wavelength bands of the plurality of mutually separated non-continuous wavelength bands, and wherein the second subset of the plurality of mutually separated non-continuous wavelength bands comprises the fourth subset of wavelength bands of the plurality of mutually separated non-continuous wavelength bands.

6. The microscope according to claim 1, wherein the first and second imaging sensor modules are configured to sense different wavelength bands of the plurality of mutually separated non-continuous wavelength bands.

7. The microscope according to claim 1, wherein the processing module is configured to control the light emission module such that, in one of the operating modes, light in a wavelength band outside of the plurality of mutually separated non-continuous wavelength bands is emitted by the light emission module.

8. The microscope according to claim 1, wherein the processing module is configured to control the light emission module such that, in one of the operating modes, light at each of the plurality of mutually separated non-continuous wavelength bands is emitted by the light emission module.

9. The microscope according to claim 1, wherein the light emission module is a multi-spectral light emission module configured to emit the plurality of wavelength bands in a mutually separated manner.

10. The microscope according to claim 9, wherein the light emission module is configured to use two or more optical filters to emit the plurality of wavelength bands in a mutually separated manner.

11. The microscope according to claim 9, wherein the light emission module is configured to use a plurality of individual light sources to emit the plurality of wavelength bands in a mutually separated manner.

12. An apparatus for a microscope, the apparatus comprising:
an interface for:
communicating with a light emission module for providing illumination of a sample of organic tissue in a plurality of mutually separated non-continuous wavelength bands, and for communicating with a first imaging sensor module and a second imaging sensor module configured to independently sense light in a plurality of mutually separated non-continuous wavelength bands of the microscope, with the first imaging sensor module being configured to independently sense light in each wavelength band of a third subset of wavelength bands of the plurality of mutually separated non-continuous wavelength bands, and with the second imaging sensor module being configured to independently sense light in each wavelength band of a fourth subset of wavelength bands of the plurality of mutually separated non-continuous wavelength bands, wherein each of the third and fourth subset of wavelength bands comprises two or more mutually separated non-continuous wavelength bands; and a processing module configured to:
control the light emission module such that in a first operating mode light in a first subset of two or more mutually separated non-continuous wavelength bands is emitted towards the sample of organic tissue, and that in a second operating mode light in a second subset of two or more mutually separated non-continuous wavelength bands is emitted towards the sample of organic tissue, the first and second subset of two or more mutually separated non-continuous wavelength bands being at least partially different, and use the first and second imaging sensor modules to perform reflectance imaging and fluorescence imaging in each of the third and fourth subset of the plurality of mutually separated non-continuous wavelength bands based on the light emitted in the first and second operating modes.

13. A method for a microscope, the method comprising:
controlling a light emission module such that in a first operating mode light in a first subset of two or more mutually separated non-continuous wavelength bands is emitted towards a sample of organic tissue, and that in a second operating mode light in a second subset of two or more mutually separated non-continuous wavelength bands is emitted towards the sample of organic tissue, the first and second subset of two or more mutually separated non-continuous wavelength bands being at least partially different, the light emission module suitable for providing illumination of the sample of organic tissue in the plurality of mutually separated non-continuous wavelength bands; and using a first imaging sensor module and a second imaging sensor module to perform reflectance imaging and fluorescence imaging in each of a third and fourth subset of the plurality of mutually separated non-continuous wavelength bands based on the light emitted in the first and second operating modes, the first and second imaging sensor modules being configured to independently sense light in the plurality of mutually separated non-continuous wavelength bands, with the first imaging sensor module being configured to independently sense light in each wavelength band of the third subset of wavelength bands of the plurality of mutually separated non-continuous wavelength bands, and with the second imaging sensor module being configured to independently sense light in each wavelength band of the fourth subset of wavelength bands of the plurality of mutually separated non-continuous wavelength bands, wherein each of the third and fourth subset of wavelength bands comprises two or more wavelength bands.

14. A non-transitory, computer readable medium comprising a program code for performing the method according to claim 13 when the program code is executed on a processor, a computer, or a programmable hardware component.

* * * * *